United States Patent [19]

Schmitz et al.

[11] Patent Number: 4,679,083
[45] Date of Patent: Jul. 7, 1987

[54] TELETEXT DEVICE WITH REDUCED PAGE-ACCESS TIME

[75] Inventors: Herman J. R. Schmitz; Marcellinus J. J. C. Annegarn; Wilhelmus F. Fekkes, all of Eindhoven, Netherlands

[73] Assignee: U.S. Philips Corporation, New York, N.Y.

[21] Appl. No.: 585,335

[22] Filed: Mar. 1, 1984

[30] Foreign Application Priority Data

Mar. 2, 1983 [NL] Netherlands .................. 8300764
Apr. 1, 1983 [NL] Netherlands .................. 8301174

[51] Int. Cl.⁴ .................................. H04N 7/087
[52] U.S. Cl. ........................... 358/147; 358/146
[58] Field of Search ................... 358/142, 146, 147

[56] References Cited

U.S. PATENT DOCUMENTS 4,308,558 12/1981 Hernandez et al. ............... 358/147
4,388,645 6/1983 Cox et al. ........................ 358/147

FOREIGN PATENT DOCUMENTS

0037077 10/1981 European Pat. Off. ........... 358/147

Primary Examiner—James J. Groody
Assistant Examiner—Michael D. Parker
Attorney, Agent, or Firm—Thomas A. Briody; William J. Streeter; Gregory P. Gadson

[57] ABSTRACT

Arrangement for receiving and processing digital signals in teletext or associated systems, comprising a picture store and a background store, the background store being arranged immediately after the source for the digital input signals such that output signals of the background store can be applied to the customary input circuit for further processing, while the picture store is arranged after this input circuit. The background store can store at least two but preferably a larger number of pages. Because of this implementation the waiting times occurring when new pages are requested are reduced to zero or substantially zero after the first request, while no additional control actions by the user are required.

17 Claims, 7 Drawing Figures

TELETEXT DEVICE WITH REDUCED PAGE-ACCESS TIME

The invention relates to an apparatus for the display during a time interval of data in the shape of a page on a television display tube. An input circuit receives digital input signals which are transmitted together with a television signal and contain in encoded form the picture information to be displayed with page and rows numbers. It is possible to transmit in a field period of the television signal the picture information of one or more rows of the pages. A picture store an input of which is coupled to an output of the input circuit is suitable for storing the encoded picture information of a page and remembering it during said time interval. A converter circuit converts the encoded picture information into video signals suitable for display by the television picture tube. The arrangement further comprises a background store arranged for storing the encoded data of at least two pages and a control circuit for controlling the transfer of the digital input signals to the picture store and from the background store.

The apparatus can be used in television receivers for receiving digital information signals, which, during predetermined television line periods in which no television picture information is present, are transmitted with the television signal by a television station as part of a teletext system.

After the digital information signals have been filtered from the complete video signal with the aid of a video input processor denoted by TVIP hereinafter, the input circuit can distinquish address portions such as page and line numbers from picture information codes. The co-transmitted digital information is periodically and repeatedly transmitted in teletext and associated systems, usually with a period of a duration of some dozens of seconds.

A control circuit ensures that as soon as a user requests a given page, the picture information codes associated with this page number are stored row-wise in the picture store.

To display the requested page, the picture store is read and, the picture information codes are converted by the converter circuit into video signals in a manner which is known per se, with the aid of a character generator.

If the repetition period of the digital information is, for example, 30 seconds, the waiting time between a request and filling the picture store would be 15 seconds on an average if no background store were used. If this average waiting period occurs for each subsequent request, the user would experience this as a nuisance.

This can be partly obviated by extending the picture store with a background store suitable for storing picture information of two or more pages.

A circuit of the above-mentioned type is disclosed in Netherlands patent application No. 7,704,398. Herein the user must indicate via the control circuit which pages he wants to store in the background store.

In the case in which the user requests a next page on the basis of the data contained in an index page, without knowing that it would be necessary to search for that page, a waiting period of 15 seconds on an average will also occur as the relevant page has not been stored in the background store.

SUMMARY OF THE INVENTION

The invention has for its object to provide an apparatus in which the average waiting period will be reduced to substantially zero after the first request, without performing additional actions for controlling the background store.

According to the invention, the apparatus includes a control circuit which for a new request for a page checks whether it has already been stored in the background store. If so the encoded picture information is transferred from the background store to the picture store via the input circuit. In the event of a new request for a page not stored in the background store the digital input signals are applied to the input circuit until the requested page is recognized in a manner which is known per se and written into the picture store. The digital input signals are applied to an input of the background store so that the background store is filled with encoded data of a number of pages.

This accomplishes the following. The information to be displayed is distributed in the customary teletext systems over a plurality of groups, what are commonly referred to as magazines, each having their own indices. A magazine comprises a maximum of one hundred pages.

The background store is chosen for instance such that it has a sufficiently large capacity to store a large number of pages, preferably at least one full magazine. This background store can, for example, be directly connected to the source of the digital input signals, so that the digital input signals are continuously written into the background store without any selection.

Another method of writing into the background store is to enter information from the moment at which the requested page number in the signal received is recognized until the moment at which the store is fully or partly filled.

In this writing method selecting a magazine can be effected with the aid of the magazine number occurring at the beginning of each line.

Neither of these methods requires an additional control action by the user or additional information from the transmitter.

At the first request for, for example, the index, this index is written into the picture store after an average waiting period has elapsed. Later this index can be displayed immediately. While the user reads the index, the background store is filled in a few seconds with the digital input signals. The period of time in which this takes place may depend on the capacity of the background store and is, for example, chosen such that the requested page is written first into the background store, simultaneously with writing of the picture store. The following pages are next entered, until the background store is filled to capacity. In a register of the control circuit it can, for example, be noted which information is stored in the background memory.

If the subsequent request by the user relates to one of the pages thus written into the register, then the control circuit connects the input circuit to the output of the background store which starts acting as a digital input signal source. The information required is now stored in the picture store in less than 0.1 sec., a waiting period which is so short that the user does not notice it. The content of the background store is not changed. In practice it has been found that a large portion of the consecutive requests always remain within the content of the background store, so that a new waiting period occurs only very infrequently, namely as soon as the user requests a page which has not yet been stored. It is of course possible to dimension the background store such that all the magazines can be stored completely. In that case there will never be a waiting period after the first request.

In an advantageous embodiment the background store is arranged such that during the periods in which no information is written into the background store the encoded data stored in the background store circulates at least once through the background store under the control of the control circuit the case of a new request for a page the input circuit is coupled to an output of the background store and recognizes in a manner which is known per se the page number of this page in the circulating information and transfers the encoded picture information associated with this page to the picture store.

The selection mechanism may then be very simple because the input circuit is normally in the waiting mode until the requested page passes during this circulation, so that no separate recording of pages contained in the background store must be effected. This requires indeed some waiting time, but this will not be noticed since it is possible to have the entire stored information circulate in a short period of time.

An expensive solution is obtained if the background store is a store of the volatile type, in which circulation of the stored data also has for its object to refresh the memory content, and in which the periods of time during which no writing-in or circulation occurs are shorter than the period of time in which the content of the background store vanishes.

Possible memories include integrated CCD-memories (Charge Coupled Devices) which now have the possibility to accommodate more than 300K-bits ($308 \times 1024$ bits) in one single integrated circuit. If each unit of 1024 bits is used for storing 3 lines of text of 336 bits each, $308 \times 3:25 \approx 37$ pages can be stored in one single module, and 3 modules are sufficient for one complete magazine. In practice, 40 or more pages can be stored in one module, as the majority of pages have less than 25 written lines.

There is then a difference with the picture store organization. In the picture store, for each line of text having 40 symbol locations per line only the picture information codes, each consisting of one 8-bit byte are stored for each line, i.e. $40 \times 8 = 320$ bits. Also included once per page is the page number which in the first line forms part of the picture information code but excludes the 16 bits per line for the line number. As the background store may be provided ahead of the input circuit all the digital information is stored, inclusive of the line numbers, so that now indeed $320 + 16 = 336$ bits per line of text are required. However writing into the store is simplified, because the separation of number bits and picture information bits is dispensed with. The background store can now completely replace the original source for the digital input signals.

The background store may be formed by a shift register of a different type. For example, a series-parallel converter followed by an addressable memory, in which w-bit "words" are stored in word address locations determined by an address counter in the control circuit may be utilized. Also in the last mentioned case, the combination behaves during writing as a serial store. A person skilled in the art can choose any suitable type of store for this purpose, this choice is not relevant to the inventive idea.

DESCRIPTION OF THE FIGURES

The invention will now be described in greater detail by way of example with reference to the accompanying drawing. In the drawing.

Corresponding elements in the Figures are always given the same reference numerals.

DESCRIPTION OF THE PREFERRED EMBODIMENT

Figure 1:
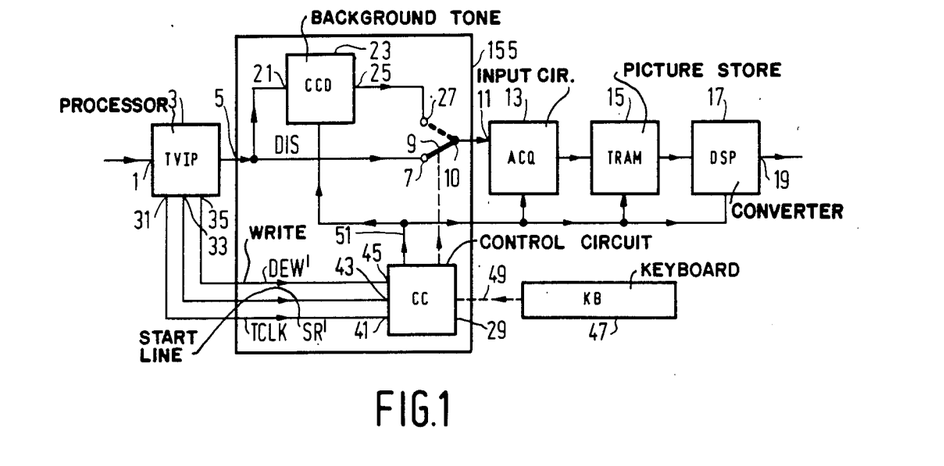
FIG. 1 shows a simplified block diagram of the basic form of an apparatus according to the invention.

In FIG. 1 a video signal originating, for example, from the receiving section of a television receiver is applied to an input 1 of a teletext-video input processor 3 (TVIP) of a type as is customary for receivers equipped for teletext. The main object of TVIP is to filter out in a manner known per se the teletext video lines which are transmitted during the vertical beam blanking period and to apply them to the further circuit as Digital Input Signals (DIS) to an output 5. The output 5 is connected to a first input 7 of a switch 9, an output of which is coupled to an input 11 of the input circuit 13 (ACQ). In a manner known per se switch 9 provides for the acquisition of the picture information codes from DIS associated with the page requested by the user. The picture information codes are stored in a picture store 15, for example in the form of a standard teletext random access memory TRAM. To display the requested page on a picture screen, TRAM is periodically cyclically read. The video signals necessary for the display are generated by the converter circuit 17 (DSP) and applied through an output 19 to a display circuit, not shown, which comprises a picture tube.

The output 5 of TVIP is further connected to an input 21 of the serial background store 23 (CCD), formed by, for example, one or more integrated CCD-registers. An output 25 of the background memory 23 is connected to a second input 27 of the switch 9, so that, if the switch 9 is adjusted to the position 27-10, DIS stored in CCD can be applied to the input circuit 13 through the input 11 to be thereafter processed in a manner known per se when the user requests a page whose information is stored in CCD.

The entire procedure is controlled by a control circuit 29. The normal teletext control will not be discussed in greater detail. Some controls which are relevant to the invention will be described hereinafter with reference to the FIGS. 4 and 5.

For the control, the circuit TVIP (3) supplies a number of timing signals which are standard timing signals for teletext. A TCLK-output 31 applies a teletext clock signal of nominally 6.9375 MHz to an input 41 of the control circuit 29.

An SR-output 33 applies at the beginning of each teletext video line period an OFF pulse "Start Line" to a corresponding input 43. A DEW' output 35 applies the Data Entry Window signal to a corresponding input 45 of the control circuit 29.

The signal DEW' is OFF ("∅") during that portion of the vertical beam blanking period in which teletext video lines are transmitted, i.e. generally during 4 or more video line periods in each 20 msec. Field period (or 1/60 sec. in NTSC countries) and provided there is a write command. Outside that period DEW' is in the ON ("1") state.

The user expresses his selection by means of a keyboard 47, which is coupled to the control circuit 29 through a signal link 49. The signal link 49 may be a wire coupling but for the purpose of remote control it may alternatively be wholly or partially formed by infrared light pulses or ultrasonic sound pulses.

The control signals conveyed by the control circuit 29 are schematically shown in this block diagram by means of the multi-channel coupling 51.

When a new page is requested, the control circuit first checks whether this page has already been stored in the background store. If not, switch 9 assumes the position 7-10 shown and the digital input signals DIS are applied to the input circuit, each time during a DEW-period.

For this check there are several solutions. It is, for example, possible to write in a secondary memory of the control circuit during writing of information in the background memory, the identity of information which has been stored in the background memory on the basis of page and line numbers.

As reading the entire background store can be effected in a fraction of a second, it is also possible, without a time delay noticeable to the user to check the background store first at a new request for the presence of the information sought. This information is read if present. If not the incoming digital input signals are scanned with a normal, average waiting time.

In the latter case a very slight increase of the average waiting period is offset by a simplification of the control circuit.

During those portions of the field period in which television signals are transmitted DEW'=1 and the teletext clock TSCLK is inoperative.

As soon as the requested page number has been recognized, with the aid of a circuit which is known per se and not shown in the drawing, ACQ 13 starts storing the picture information of this page in the picture store 15.

Although this is not necessary, storing DIS in the background store may be effected continuously or may be started at the new request. Storage may alternatively start simultaneously with the storage in the picture store as soon as the page number has been recognized.

As soon as the requested page has been stored in TRAM (15), the display thereof can be stated, whilst the background store is further written-in. If the background store has a capacity of x lines, writing may be terminated x line periods after the beginning of writing TRAM. This can be effected in different manners. It is possible to count x pulses SR' in the control circuit 29, or in the case of 4 teletext lines per DEW period x/4 DEW' pulses can be counted. It is alternatively possible to stop writing as soon as a predetermined higher page number is recognized. The exact location where the address recognition is provided is not important for the invention. This may be effected in both TVIP and ACQ. For this purpose it is also possible to apply DIS to the control circuit 29 if address recognition is effected there.

After the writing operation has ended, the DIS now represent a number of pages in the background memory, so inclusive of the line numbers. TRAM still contains the picture information exclusive of the line numbers of the requested page.

If the next request would relate to a page which has not yet been written-in, then the above-described procedure is repeated.

In the majority of cases the next request was however found to relate to a page which was already stored in the background store 23.

In that case switch 9 is adjusted to the position 27-10, whereafter ACQ can forward the requested page picture information in TRAM.

If the background store 23 is not of the volatile type, this transfer can be effected by addressing the store since it is accurately known where the requested page is stored. Alternatively, the information stored in the background store 23 can be circulated, ACQ now waiting until the requested page passes. In that case the background store 23 operates wholly as a different source of digital input signals, the only important difference being that the circulation period is preferably equal to a field period reduced by the vertical beam blanking period, that is to say somewhat shorter than 20 msec., so that the average waiting time will exceed 10 msec. This is so short that the user will not notice it.

Figure 2:
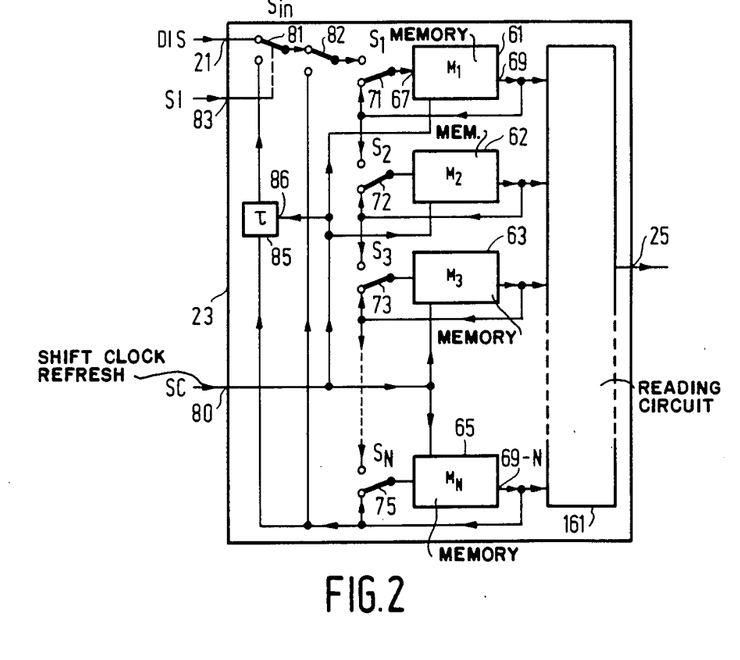
FIG. 2 shows a block diagram of a practical embodiment of the background store.

FIG. 2 shows a practical embodiment of a serial background store 23 comprising one or more memory modules 61 to 65, exclusive. In this example each module is chosen to be a CCD shift register having 315392 bit elements arranged in series. Although physically there is no difference, a simple organisation is obtained if a module is used having 308 groups of 1024 bits each.

Each module has an input 67 and an output 69 which can be coupled to each other with the aid of switches 71 to 75, respectively. In the position shown of these switches each module is a circulating module and is not connected to any other module.

In this situation the store is periodically refreshed. As this is also always effected once between the writing periods DEW, 308×1024 shift pulses must be applied in approximately 15 msec. for a non-recurrent refreshing operation. These 315392 shift pulses in 15 ms correspond to a shift clock frequency of approximately 21 MHz. Such a shift clock signal SC is applied to the shift clock input 80 by the control circuit 29.

For writing the background store the switches 71 to 75, inclusive are adjusted to the other position during a DEW period. The modules 61 to 65, inclusive are then arranged in series with each other. During a DEW period digital input signals DIS can be applied to the input 67 of the first module 61 through the input 21, a store input switch 81, a read switch 82 and the switch 71. The switches 81 and 82 are then in the position shown in FIG. 2. The switch 81 is controlled from the control circuit 29 with the aid of a signal SI which is applied to an input 83 of the background store 23.

The writing operation can now be effected at the rate of the teletext clock which then also serves as a shift clock for the modules 61 to 65, respectively.

If in a DEW-period m=4 teletext lines are transmitted, 4×336 bits are consecutively written in in that manner. As the number 336 comprises a factor of 3, multiples of 1024 are never created in this manner, so that a situation is obtained in which for n modules always N-1 lines are stored distributed over two modules i and i+1 (i=1, ... N). Thus, it is advantageous to fill up for each group of 3 lines the 3×336=1008 bits transferred therein with 16 bits to 1024.

An alternative may be to opt for storage modules with a multiple of 336 bits. The modules described here by way of example are, however, cheaper, as they are already used for storing a normal television picture in a digital form, 308 lines being stored per field of 312.5 lines. If per line 512 elements of 14 bits each are recorded 7 of these modules have the capacity to store the complete information of a television field. It is a matter of course to use modules of this type in the field of teletext.

A surprisingly simple organization is obtained when the shift clock of approximately 21 MHz is synchronized such with the teletext clock that the shift clock operates at precisely three times the teletext clock frequency, that is to say at 20.8125 MHz. In this situation the switch 81 ($S_{in}$) is controlled such that during a portion of each third period of the shift clock it is in the position shown, and is in the other position for the remaining time of the period. At the teletext clock frequency the shift clock produces 1024 pulses per line period, so that at the end of the line period the first bit of a line of text has arrived in the last part of a (fictitious) group of 1024 bits, for example in location 1021. Each stored bit is followed by two in the first instance idle shift operations, so the second information bit is in location 1018 of the group of 1024 bits, etc. Thus, the 336$^{th}$ information bit arrives in bit position 1021−3×335=16. The remaining bit positions remain as yet unfilled, see FIG. 3, line A—A. So as to fill the intermediate positions, the information bits shifted-out at the end of module M are fed-back to the input of the first module 61 during the time in which the switch 81 is in the other position. As the first bits of a line or text are always at the end of a group in position 1021, an old bit appears at the output 69 N of module 65 simultaneously with writing a new bit, so this old bit would reach the switch 81 at an instant which is not in the position shown. To prevent this, a delay circuit 85 which produces a time delay of one shift period is arranged between the output 69-N and the switch 81. This can be effected in a simple way by extending the overall shift register having N×308×1024 bits by adding a flip-flop 84 controlled by the shift clock by a shift clock input 86.

It will be obvious that the bits which were originally written in the bit positions, 1, 4, 7, 10 etc. are now written after one passage through all modules plus one time delay bit in the position 2, 5, 8, 11 etc. and after a second passage in the positions 3, 6, 9, 12 etc. The whole shift register is filled at the end of the third passage. (See FIG. 3 lines B—B and C—C).

Figure 3:
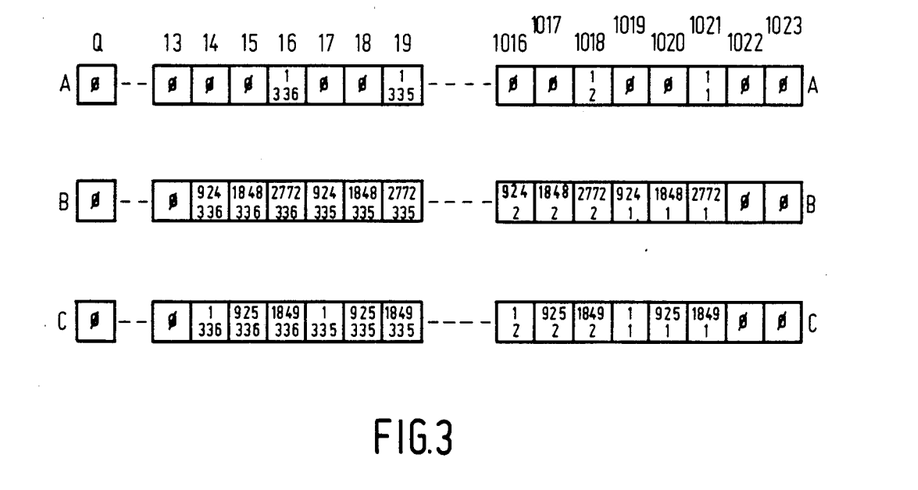
FIG. 3 shows the position of lines and bits thereof in the background store.

Assuming N=3, now a total of 3×3×308=2772 lines having been stored. The first bit of the 2772$^{nd}$ line is stored in the 1021$^{st}$ bit of the first group of 1024 bits of the first module and the 336$^{th}$ bit of that line in bit 16 of that group. Then the first bit of the 2771$^{st}$ line is stored in the 1021$^{st}$ bit of the second group of 1024 bits of the first module, etc., finally the first bit of line 1849 is stored in the 1021$^{st}$ bit of the 308$^{th}$ group of the third module. The information of line 1848 was previously stored in this group, but has in the mean time been placed in the first group of module 1, shifted by one position, so bit 1 in bit 1020 and the 336$^{th}$ bit in bit position 15. The bit positions $\emptyset$ to 13, inclusive, 1022 and 1023 of all 3×308 groups are unoccupied.

Figure 4:
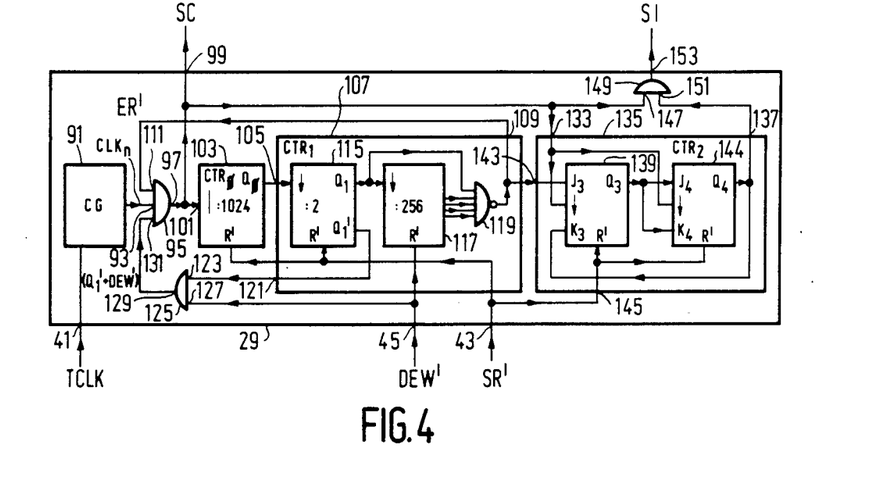
FIG. 4 shows a relevant portion of the control circuit such as it is used during the storage of data in the background store and during the refresh operation.

FIG. 4 shows an example of a control circuit portion which is relevant to the invention and produces the required timing signals during writing and refreshing of the background store. The operation thereof will be described with reference to the time diagram in FIG. 5, in which the lines of the time diagram have as references the names of the signals and counters as they are used in FIG. 4 and in the following description.

The control circuit comprises in the first place a clock generator circuit 91 (CG) which generator produces a clock signal having a frequency which in a free-running state is approximately n times the frequency of the teletext clock TCLK, where n is an integer. The clock generator 91 can be synchronized with TCLK through the input 41, in such a manner that its frequency becomes equal to n times the TCLK-frequency. In the example described n=3 but this is not essential to the invention. The clock generator 91 applies a clock signal $CLK_n$ to a first input 93 of an AND-gate 95 which has an output 97 for a shift clock signal SC at an output 99 of the control circuit.

In addition, the signal SC is applied to an input 101 of a divide-by-1024 divider 103, which is, for example, in the form of a 10-bit counter $CTR_\emptyset$. In this example it is assumed that all counters change their positions when a signal edge changes from ON to OFF. In the drawings of the signals in FIG. 4 ON is always at top and OFF at the bottom. All the counting elements have resetting inputs R' through which the counters can be set to the $\emptyset$ position and remain in the $\emptyset$-position as long a R'=$\emptyset$.

An output signal $O_\emptyset$ of the counter 103 is applied to an input 105 of a 310-position counter 107, which can assume the positions $\emptyset$ to 309, inclusive. The counter 107 has an output 109 for an output signal ER' which is in the ON condition during the counting positions $\emptyset$ to 308, inclusive and in the OFF state during the counting position 309. The ER' output 109 is connected to a second input 111 of the AND-gate 95.

In this example the counter 107 is in the form of a 9-bit counter having a first flip-flop 115, eight subsequent flip-flops 117 and a NAND-gate 119 for decoding the position 309 of the counter. The output of the NAND-gate 119 constitutes the output 109 of the counter 107. An output for an output signal $Q'_1$ is connected to an output 121 of the counter 107. $Q'_1=1$ when the content of the flip-flop 115 is a $\emptyset$, that is to say for all the even positions of the counter 107. $Q'_1\emptyset$ for all the odd positions.

The signal $Q'_1$ is applied to a first input 123 of an OR-gate 125 a second input 127 of which is connected to the input 45 for DEW' of the control circuit 29. An output 129 of the OR-gate 125 is connected to a third input 131 of the AND-gate 95.

The shift clock signal SC is further applied to an input 133 of a three-position counter 135 which has an output 137 for the output signal $Q_4$. In this example the three-position counter 135 is provided, in a manner known per se with two JK-flip-flops 139 and 141 having an input 143 for the $J_3$ input of the first flip-flop 139 and a resetting input 145 for both flip-flops. When the inputs 143 and 145 are both ON, the counter 135 passes in a cyclic sequence through the three positions:

"∅" where $Q_3=∅$, $Q_4=∅$;
"1" where $Q_3=1$, $Q_4=∅$; and
"3" where $Q_3=1$, $Q_4=1$.

Finally, the signal SC is applied to a first input 147 of an AND-gate 149 a second input 151 of which is connected to the output 137 of the three-position counter 135. An output 153 of the control circuit 29 is formed by the output of the AND-gate 149 for applying the signal SI to the input 83 of the background store 23. SI is ON when SC and $Q_4$ are both ON, that is to say each time the counter 135 is in the position "3".

Figure 5:
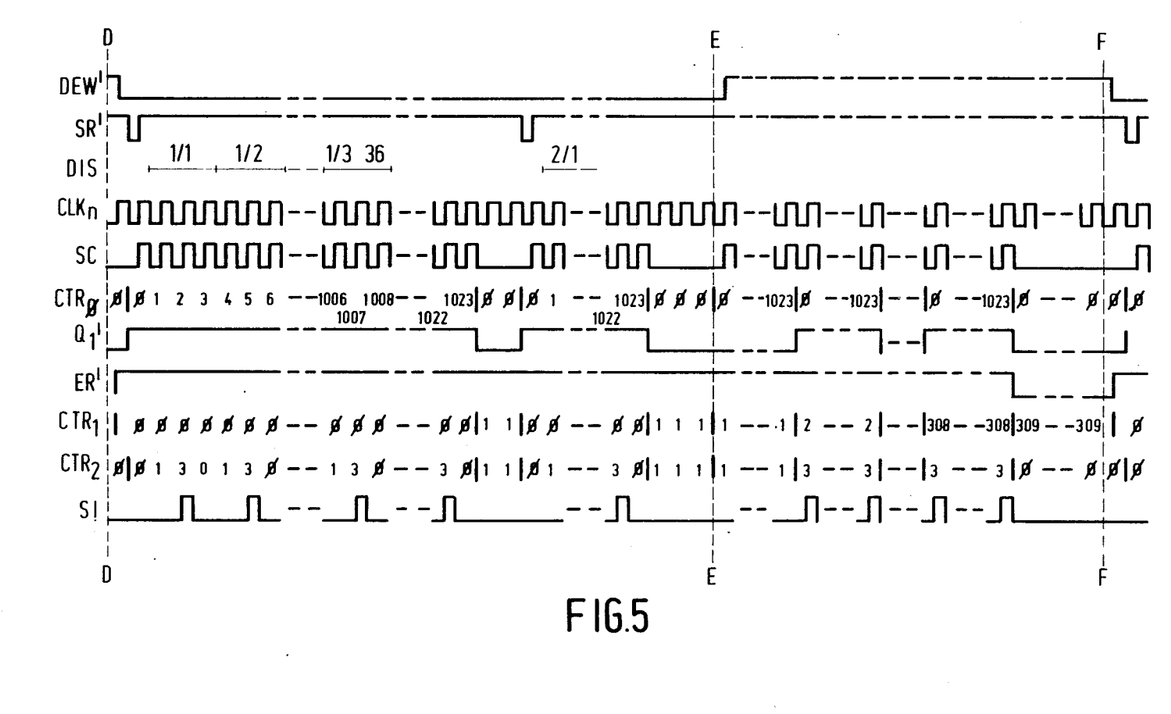
FIG. 5 shows a time diagram associated with the circuit shown in FIG. 4.

The left hand portion D-E of FIG. 5 illustrates the variation of signals and counting positions during writing DIS in the background store, the right hand portion E-F illustrates these variations during refreshing of the information in the background store. Writing is always effected during a DEW period, so with DEW=1 and DEW'=∅. In response to DEW' the eight flip-flops 117 of counter 107 remain in the zero position, so that ER'=1, so the second input 111 of the AND-gate 95 is ON during the entire writing period. At the beginning of the first video line during the DEW-period the signal start line (SR'=∅) is produced, causing the counter 103, the flip-flop 115 and the counter 135 to be reset to the zero position. As a result thereof $Q'_1=1$ and the first input 123 of the OR-gate 125 is ON. The second input 127 remains in the OFF condition in response to DEW'=∅. The output 129 is ON and consequently also the first input 131 of the AND gate 95. In this state of the AND-gate 95 each pulse $CLK_n$ of the clock generator results in a pulse SC. During the DEW period the clock generator is synchronized with TCLK at three times the frequency of the teletext clock.

There now follow 1024 shift clock pulses SC, in response to which the counter 103 passes through the position from ∅ to 1023, inclusive and thereafter counts further to the zero position. At the transition from 1023 to ∅ flip-flop 115 counts, so that the subsequent counter 107 is adjusted to the 1-position where $Q'_1=∅$. In response thereto the first input 131 of the AND-gate 95 is adjusted to the OFF position, so that no further pulses SC are produced. During the first 1024 pulses SC, SI is adjusted to the ON position in response to each third pulse SC so that through the switches 81 and 71 of the background store (FIG. 2) the bits 1/1 to 1/336 inclusive of the digital input signals of the first video line of this DEW period are sequentially written in the background store in the locations denoted by A—A in FIG. 3.

After a new SR' the writing procedure is repeated starting with the first bit 2/1 of the second video line until the last bit m/336 of the last video line m of the DEW-period has been stored. Now no new SR' is coming forward so that the counter 303 remains in the zero position, $Q'_1$ remains OFF until the end of the DEW-period. Immediately after instant E the DEW'-signal is adjusted to the ON condition and the memory refreshing period starts. DEW' being equal to 1, the output 129 of the OR-gate 125 and consequently the third input 131 of the AND-gate 95 become ON, so that pulses SC are produced again. The state of the signal $Q'_1$ is not important for the OR-gate 125 as long as the input 127 is maintained in the ON condition by DEW'=1.

At the beginning of the refreshing period the counter 107 is in the one position. After 1024 SC-pulses it is adjusted to the position "2". After 308×1024 SC-pulses the counter 107 is finally in the position "309", then ER' becomes equal to ∅ and consequently the second input 111 of the AND-gate 95 is adjusted to OFF, so that no further shift clock pulses SC are produced. With the 308×1024 SC-pulses all modules $M_1$ to $M_n$, inclusive have been circulated through precisely once, as required for a refreshing period. In this period of time the clock generator CG (91) operates in the non-synchronized state at approximately three times the teletext frequency or somewhat higher, for example at 21 MHz. The 308×1024 SC-pulses then require 308×1.024:21=15 msec. Thus, the refreshing operation is completed before a new DEW-period is started after a field period. In the subsequent DEW period writing bit (n+1)/1 of the $(n+1)^{th}$ line of text starts. The control circuit 29 continues this method until a maximum of 2772 lines of text have been written in.

During the refreshing period the output of the switch 81 of the background store is not interconnected to module $M_1$ so that the position of the switch 81 is irrelevant. Counter 134 may continue counting during the refreshing period, so that a pulse SI produced in response to every third pulse SC. $J_3$="1" or $J_3$=ER' is sufficient.

The circuit described is only given as an example to illustrate how the different periods of time can be realized with the aid of counting circuits. A person skilled in the art can design many variations thereof, in which the choice of different types of flip-flops, such as, for example, D-flip-flops is possible. The same timing pulses can be realised just as easily if the counting operation is continued at rising edges or at pulses themselves. If at switch-on the counter 103 is adjusted to the zero position, a resetting operation at a later instant is not necessary, as this counter always stops in the zero position.

If a different number of modules M in the background store is opted for, $3×380×N$ lines can then of course be stored. At N=7 a maximum of 6468 lines can be written which, for an average of 20 lines per page is sufficient for approximately 320 pages, that is to say for more than three magazines.

Once the background store has been written, the lines of one page are stored in consecutive groups of 1024 bits, which are usually located within one module. Thus, the lines 1 to 20 inclusive of the page requested first are located in this example in the groups 308 to 289, respectively of the $N^{th}$ module.

There are several methods of reading back the stored information.

For that purpose FIG. 2 shows a reading circuit 161, one side of which is connected to the output 69 to 69-N inclusive of the M-modules, the other side to the output 25 of the background store.

In the reading circuit the control circuit selects, for example, that input which corresponds to the module in which the first line of the requested page has been stored, or a selection circuit samples, for example, sequentially the outputs of the modules. As the refreshing cycle is passed through reading is effected every three bits, the information is applied through the output 25 and the switch 9 to the input 11 of the input circuit 13, which receives the bits at a frequency of approximately 7 MHz, approximately equal to the normal teletext frequency. The information of the lines requested is transferred in customary manner to the picture store 15 until the next higher page number is detected. As the refreshing operation is repeated every 20 msec. an average waiting time of 10 msec occurs, which is so small as to be disregarded. In some cases the last lines of a page is contained in the preceding module. If group 1 of a module has been read without a new page number being detected, then the selection changes over to this preceding module. Reading one of every three bits is effected, for example, with a switch $S_{off}$, not shown, which is controlled in a similar manner as the switch $S_{in}$ (81). For this purpose the positions, for example "∅", "1" and "3" of the counter 135 can be decoded, the control circuit coupling the switch $S_{off}$ to that decoding facility which produces the requested lines at the output 25. FIG. 3 shows that for example all the lines from 1848 to 1667, inclusive occur in positions in the group having location numbers equal to a multiple of 3 which bits appear after x.1024 +Y.3 pulses at the output of the module. For the position to be decoded the code is chosen which corresponds to x-modulo 3.

A simpler organisation is obtained if prior to reading all the switches 71 to 75, inclusive in the background memory 23 and the reading switch 82 are adjusted to the other position and a refreshing operation is effected once with N×308×1024 shift clock pulses SC and $S_{off}$ being coupled to the counter 135. The read circuit is now only connected to one of the outputs 68 to 69-N inclusive. The total information of all the modules now passes in N×15 msec., so if N=7 in approximately 105 msec. The simplified organisation then results for the requested page in an average waiting time of 52.5 msec., i.e. approximately 1/20 seconds, which is still hardly noticeable.

It will be obvious that after N×308×1024 pulses SC the whole background store has once again been refreshed and all information is again in exactly the same positions. In this case the counter 107 must be extended such that it can have N×308+2 positions, for N=7 refreshing must then be stopped in the position 2157, the counter 107 having been extended with two bits to 11 bits.

In this situation the signal ER' must then be decoupled from the output of the NAND-gate 119 and must be connected to the output of a second NAND-gate, not shown, for decoding the position 2157. At least during this period of time the $J_3$ input 143 of the counter 135 must be in the ON condition. As has already been described in the foregoing the input 143 may continuously be in the ON condition, or alternatively be coupled to the signal ER'.

The construction of the read circuit and any variations of the circuits described can be designed by a person skilled in the art with the aid of auxiliary means which are known per se.

As mentioned in the foregoing, the apparatus according to the invention can also be used in a different way. It is alternatively possible not to stop writing the background store 23 as soon as all groups have been filled, but to continue writing thereafter.

In the example in which three modules are used it will be obvious that if after the 2772$^{th}$ line, a subsequent line written in the latter will overwrite the first line. From that point onwards the oldest information is then always overwritten. As the available information is subjected to changes, it is purely coincidental whether the next requested page is contained or not contained in the background store and the moment the request is made. Now, however, an average of 2772:20=130 pages are stored. If the total stock of teletext pages is, for example, 195 pages, there will be no waiting time for 130 out of the 195 requests. For the remaining 65 possible requests, those pages whose turn to be written in has almost come, within a period which is equal to 65/195=1/3 part of the teletext repetition period, so the average waiting period is 1/6 part thereof. With a repetition period of approximately 30 seconds the average waiting time in 65 of the 195 random requests is therefore 1/6×30=5 seconds. For a total of 195 requests a waiting time of 5 seconds occurs 65 times on an average and a waiting time of substantially zero seconds occurs 130 times, so that the total average waiting period is approximately 1.7 seconds with a maximum of 10 seconds.

In the case described in the foregoing the waiting time for pages already stored is also "zero". For less frequent requests for pages not stored the waiting time is 15 seconds on an average with a maximum of 30 seconds. The second method will generally be preferred if the ratio between the number of pages which can be stored and the total teletext information content exceeds approximately 0.5. This is the case for three modules and a stock of 195 pages, but not for 3 modules and a stock of 800 pages.

If the background store can be chosen with such a large capacity that the total stock can be stored, then for both cases the waiting time becomes "zero" after the first request, so that both methods of use are equivalent.

Except for the fact that in the second method writing is not stopped after N×3×308 lines of text have been stored, further actions during writing, refreshing or reading are fully identical to those described for the first method of use.

It also holds for both methods of use that the existing standard integrated circuits 3, 13, 15 and 17 remain suitable for teletext processing without any modification.

The control circuit 29, the switch 9 and the switching elements of the serial background store 23 (without the memory modules 61 to 65, inclusive) can be combined into one novel integrated circuit 155 (FIG. 1).

Figure 6:
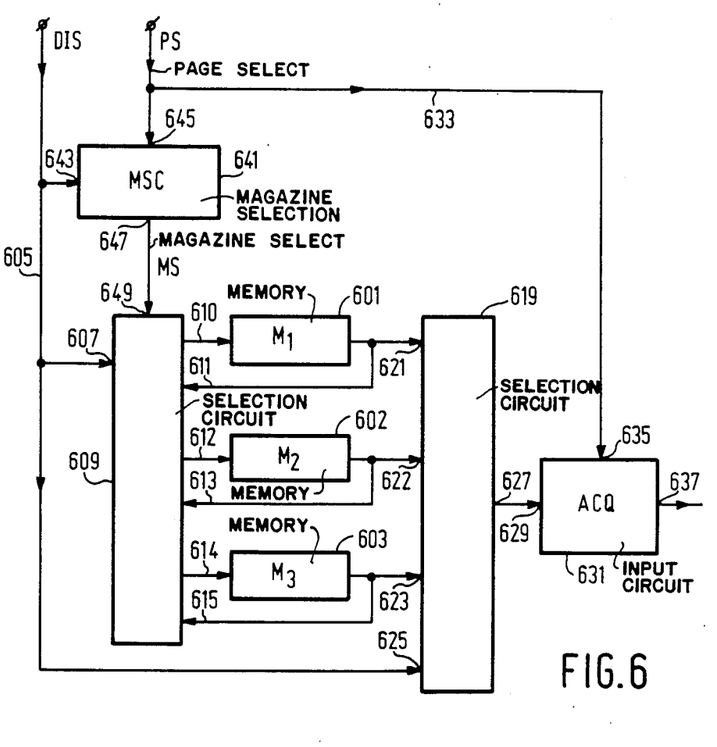
FIG. 6 shows a simplified block diagram of a background store with only magazine selection.

In FIG. 6 the background store is formed from one or more storage modules 601, 602, 603 which have an adequate storage capacity for storing digital input signals DIS relating to a complete magazine of one hundred pages. These DIS are applied to a signal input 607 of a first selection circuit 609 through an electric connection 605.

In the same way as described in the foregoing, the first selection circuit 609 serially interconnects during a writing period DEW (data entry window during a portion of a television field period) the modules 601, 602, 603 by the connections 611, 612, 613 and 614. Outside DEW, if the store is of a type having a refreshing cycle, the outputs of the modules are connected to the inputs by the connections 611, 610; 613, 612 and 615, 614.

A second selection circuit 619 has inputs 621, 622, 623 for the output signals of the modules 601, 602, 603 on the respective connections 611, 613 and 615, and an input 625 for DIS connected to the connection 605. An output 627 of the second selection circuit 619 is connected to an input 629 of the input circuit 631 (ACQ) for reading the content of the background store.

With a control element and a control circuit, both not shown, a user selects the number of a page required by him, as a result of which a page selection signal PS is applied in a manner known per se to an electric connection 633 for applying PS to a further input 635 of the input circuit 631. An output 637 of this input circuit connects it to the further, known components of the teletext circuit, such as the picture store, character generator and video signal generator.

In addition, the background store has at its input 605 for the DIS a magazine selection circuit 641 (MSC) which has a DIS-input 643 and a PS-input 645. An output 647 for a magazine selection signal MS is coupled to a selection input 649 of the first selection circuit 609.

The background store operates as follows. If a page is requested, the input circuit 631 is connected by the second selection circuit 619 in a manner known per se to the storage modules to determine whether the DIS relating to the requested page are stored in the store.

As described in the foregoing, this can, for example, be effected by sequentially connecting the input circuit to the storage modules 601, 602 or 603 during three consecutive field periods during a refreshing cycle. If the requested DIS are detected, the input circuit 631 conveys from this DIS line numbers an encoded picture information to an output 637 for further processing. Thereafter the second selection circuit 619 connects the input 629 of the input circuit to the input 625 of the second selection circuit 619 for DIS until a new page is requested. In this situation the input circuit 631 continues to check the DIS for data relating to the selected page, so that, for example, intermediate changes of the content of these pages are followed.

In the prior art systems such as teletext and associated systems, the number of a requested page is formed by three figures, the first figure of which represents the magazine number.

If it is found that the information looked for is not stored in the background store, when the information is derived first from the DIS through the path 605, 625, 619, 627 and 629 and the information reaches the input circuit 631 with an average waiting period of 10 to 15 seconds depending on the transmitter cycle time for the complete stock of teletext pages.

In addition, the page number is received by the magazine selection circuit 641. This magazine selection circuit compares the first figure of the requested page number at the beginning of a teletext video line in the DEW period to the magazine number included therein. If these magazine numbers agree, a magazine selection signal MS is generated and applied to the selection input 649 of the first selection circuit 607. The magazine selection signal MS remains "ON", until a different magazine number is found at one of the following what are commonly referred to as "PAGE HEADERS" (always line 0 of a page).

During the DEW periods in which MS is "ON", this DIS are written in a manner known per se into the storage modules which are then arranged in series. After not more than one complete transmitter cycle has passed all the lines relating to the selected magazine are contained in the background store. A subsequent request relating to a page from the same magazine will thereafter always be acknowledged within three field periods, that is to say with an average waiting time of approximately $1.5 \times 20 = 30$ ms, which is so short as to be noticeable to the user.

As a magazine will usually not occupy one hundred full pages, writing DIS of the selected magazine will be continued until the next request for a page of a different magazine, so that after some time the entire background store is exclusively filled with information relating to this magazine, it being possible that the same information occurs twice or more times in different store locations.

As the magazine number is represented by an eight-bit Hamming code, the decision whether the information must be written-in can only be taken eight teletext bit periods after the beginning of this symbol. As the symbol itself must also be written-in when the line considered belongs to the magazine looked for, a writing-time delay circuit which produces a time delay of at least eight teletext bit periods for the signal to be written into the store is included in the magazine selection circuit 641. These writing time delay circuits are known per se. In most cases a shift register is used for this purpose, which in the present case must have at least eight shift elements.

Figure 7:
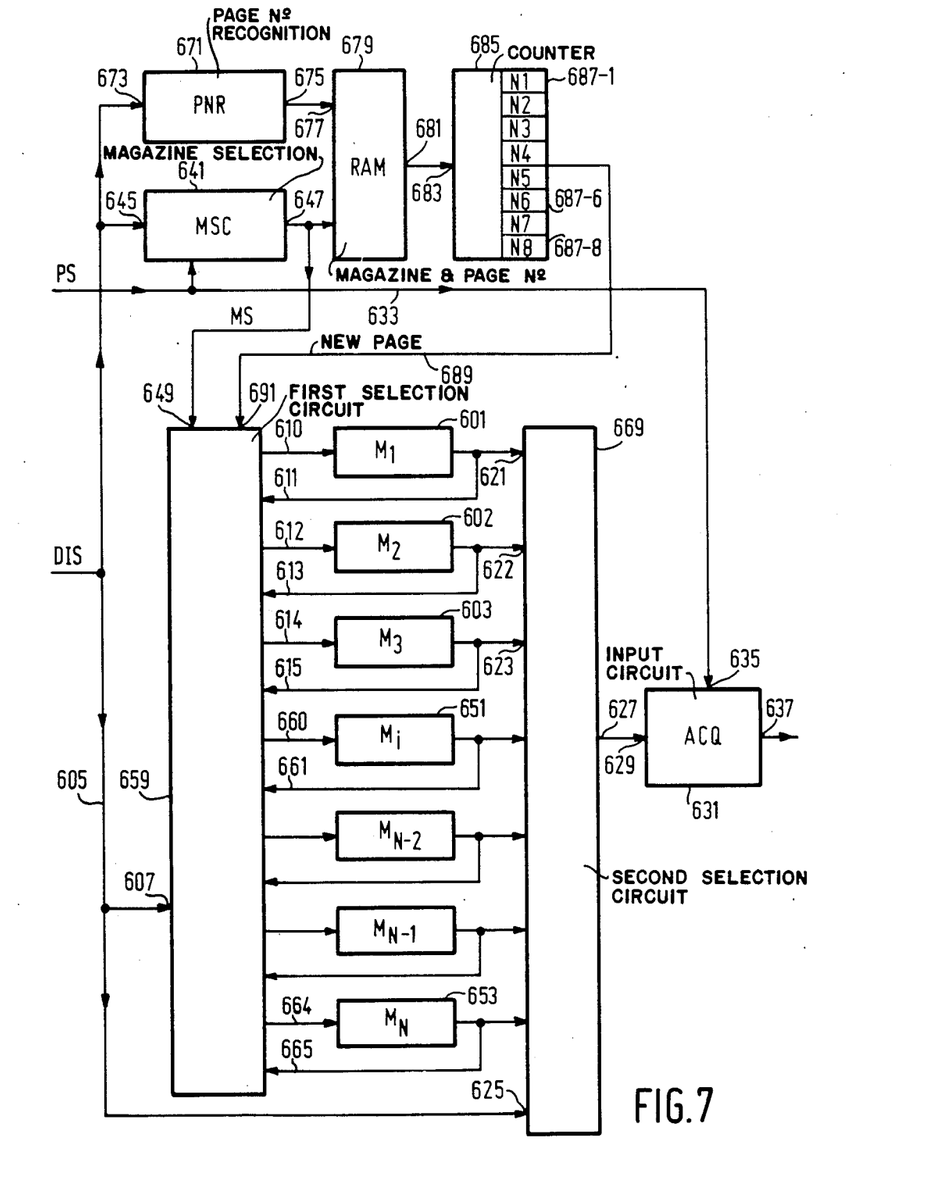
FIG. 7 shows a simplified block diagram of a background store for magazine selection comprising a second storage section for time compression purposes.

FIG. 7 shows a larger background store comprising a number N of storage modules. In FIG. 7 elements corresponding to those in FIG. 6 have been given the same reference numerals.

The first selection circuit 659 and the second selection circuit 669 have been extended, to correspond to the large number of storage modules.

A first portion of the N storage modules is formed by, for example, these modules 601, 602 and 603 as in FIG. 6. During a DEW period, as is also the case in FIG. 6, the output of the third module 603 is coupled to the input of the first module 601 by 615, 659 and 610. As in the previous case, outside the DEW period the outputs of all the modules are connected to the inputs by 611–610 etc. to 665–664, inclusive. As is also the case in the arrangement shown in FIG. 6, the modules 601, 602 and 603 are used for magazine selection. The mode of operation is the same as described with reference to FIG. 6.

The second part of the background store comprises the modules $M_i$ (651) to $M_N$ (653), inclusive, the output of the last module 653 being connected during a DEW period to the input of module 651 by 665, 659 and 660. The second part of the background store is suitable for storing information relating to magazines other than the selected magazine and is operative as long as the signal MS at the input 649 of the first selection circuit 659 is "OFF", in the same way as described in the above-mentioned Patent Application.

When reading information from the store the second selection circuit 659 operates in the same way as described in the above-mentioned Patent Application.

After a run-in period, the first part of the background store will be completely filled with DIS information relating to the magazine selected last, the second part will always contain a portion of the further magazine which portion is not known a priori.

If, for example, the entire stock of teletext pages is 300, then the following situation occurs. Each of the seven modules mentioned in this example can contain an average of 37 pages.

If the selected magazine comprises, for example, 60 pages, this magazine is entirely contained in the modules 601, 602 and 603, partly in two-fold.

Of the remaining 240 pages $4 \times 37 = 148$ are stored, more specifically those pages which were transmitted last by the transmitter.

In the majority of cases a subsequent request will relate to the previously selected magazine. As in the case of FIG. 6, such a request is acknowledged without a noticeable waiting period.

If the next request relates to a page from a different magazine then there is a probability of 148/240 that this page is stored in the second part and the request is acknowledged with the same unnoticeably short waiting time.

In the remaining cases the request relates to information which was not transmitted shortly before and which will consequently be transmitted directly or substantially directly after the request. This implicates that for 94 out of the 300 possible requests there will occur an average waiting time of 47/300 times the transmitter cycle time of approximately 30 seconds, that is to say 4.7 seconds. As the majority of requests fall within the first group, the overall average waiting time will be in the order of only one second.

In the example outlined above it is obvious that two modules would have been sufficient to store the 60 pages of the selected magazine.

A further possible extension which is also shown in FIG. 7 renders it possible to adapt thereto the feedback connections in the first selection circuit 659 in such a way that in the latter example the output 613 of module 602 is coupled to the input 610 of module 601 during the DEW period, and in addition 665 is connected to 614 so that in this example the second part of the background store is now formed by 5 modules for storing 5×37=185 of the remaining 240 pages.

To that end the arrangement comprises a page number-recognizing circuit 671 (PNR) having an input 673 for the DIS and an output 675 for a code representing the magazine number and the page number, which codes are transmitted in the what are commonly referred to as page headers. These codes are applied to an address input 677 of the random access memory 679 (RAM) which has at least 800 memory addresses in each of which one bit is stored.

At each selection of a new television channel the content of all the 800 addresses is adjusted to "∅".

As soon as thereafter a page number is recognized, for example page 17 of magazine 6, a "1" is written into the memory address 617.

If magazine 6 contains 60 pages, after some time, at the latest after one transmitter cycle time, 60 out of the 100 addresses 600 to 699 inclusive will contain a "1".

A read output 681 of the RAM 679 is connected to a counting input 683 of the counter circuit 685 which comprises for example eight counters 687-1 to 687-8, inclusive. After some time all the counters will have a counting position representing the number of pages of the corresponding magazines, in this example the counter N6 (687-6) has obtained the position "60", as in each group of 100 memory addresses the number of ones is always counted. This counting operation is effected periodically, for example every second of each field period, so that if the content of a magazine is extended at the transmitter side by one or more pages, the relevant counting position is adapted to the new, larger number of pages.

At a request for a new page the first selection circuit 659 is coupled through a signal connection 689 and a module selection input 691 to that counter which corresponds to the magazine number, in this example 687-6. If the counting position is lower than 37, or in the case a safety margin is taken for example lower than 35, the first selection circuit 659 reserves only module 1 for the magazine selection because the feedback path 610-611 is now continuously present, within and outside the DEW-period, and for the second part the feedback path from 665 to 612 during the DEW-period.

If the counting position is "60", as was opted for in this example, two modules are reserved as described above. At a counting position higher than "74" (or for example "70") the first three modules are reserved for the magazine selection. The remaining modules are always used for the pure time compression occurring because of the fact that when stored information is read this reading can be effected continuously instead of only during the small DEW-fraction of a field period as in the case of a teletext device without background store.

In a simplified embodiment it is possible to reduce the RAM-memory 679 to 100 address locations, the counting circuit 685 then comprising only one counter 687. In that case only the pages of the selected magazine are counted. The first selection circuit 659 starts by reserving one module. As soon as the counting position exceeds the selected value of "35" to "37", or the value of "70" to "74" one module (2 or 3, respectively) is always added to the reserved modules. It then takes however a slightly longer period of time before a larger magazine is stored in the proper sequence in the magazine section.

If the selected magazine is a small magazine with, for example, 30 out of the 300 pages so that the reservation of one module is sufficient for the magazine selection then 6×37=222 pages of the remaining 270 pages can be stored, so that a still further improved reduction of the average waiting time is obtained than that occurring when three modules are permanently reserved for the magazine selection.

It will be obvious that the variable reservation is already possible when a background store having a capacity of at least 100 pages is used, in the present situation three modules, 1, 2 or 3 modules being reserved for magazine selection in dependence on the size of the selected magazine, and consequently 2 or 1 and ∅ modules, respectively are used for time compression.

It will also be obvious that the invention is not only applicable to teletext receivers, but can be applied equally to receivers for comparable systems such as Antiope, Telidon, and such like.

What is claimed is:

1. An apparatus for generating video text data carried on a television signal during a time interval of each field, said video text data including a plurality of magazines, each magazine including a plurality of numbered pages and numbered rows of text, comprising:

a processor for deriving said text data from said television signal;

an input circuit for processing said text data;

a picture store connected to receive and store a selected page of said text data from said input circuit;

a background store connected to said processor for storing at least two pages additional to said selected page of said video text data;

a switch connected to deliver said text data from said processor, and said background store to said input circuit;

a control circuit connected to control said switch, whereby said input circuit receives either said processor text data or said background store data, and further connected to control writing of said background store; and keyboard means connected to said control circuit from which to send a selected page number of said text data to said control circuit, whereby said control circuit identifies, in response to a single page selection, a magazine containing said pages to be written into said background memory, and said control circuit further identifies whether said processor text data or background store data is to be delivered to said picture store.

2. An apparatus as claimed in claim 1, wherein the control circuit comprises a secondary store for remembering those pages which were stored in the background store during writing.

3. An apparatus as claimed in claim 1, wherein the background store is formed by a series-parallel converter and an addressable memory having a word length of w bits, the series-parallel converter always combining w consecutive bits of a serial input signal into a memory word and writing it at address locations chosen by the control circuit.

4. An apparatus as claimed in claim 1, wherein the background store is a serial store, and during periods in which the background store is not being written, the data stored in the background store always circulate at least once in the background store under the control of the control circuit, and when a new request for a page is received from said keyboard means, the input circuit is coupled to an output of the background store and recognizes the page number of said newly requested page in the circulating data and transfers the data associated with said newly requested page to the picture store.

5. An apparatus as claimed in claim 4, wherein said serial background store is a store of the volatile type in which circulating the stored data also refreshes the store content, and the periods of time in which no information is stored or circulated can be shorter than the time in which the information vanishes from the background store.

6. An apparatus as claimed in claim 4, wherein the background store is formed from two or more serial sub-memories which, during writing, are in series with each other and, during the period of time no writing is effected are coupled such that the data stored in one of said sub-memories circulate only within that sub-memory, and also comprises a selection circuit which consecutively couples said sub-memory outputs to the input of the input circuit during a period of time no writing of said background store is effected.

7. An aparatus as claimed in claim 4, wherein the background store is formed by two or more serial sub-stores which are in series with each other during writing and are uncoupled during the period in which no writing is effected such that the data stored in one said sub-stores circulate only within said one sub-store, and also comprises a selection circuit which, in response to the control circuit, during reading from the background store, couples the output of the sub-store which contains the requested page data to the input of the input circuit.

8. An apparatus as claimed in claim 4, wherein the serial background store has an internal transfer rate which is the n-fold of the bit frequency of the text data, the control circuit comprising a clock signal generator circuit having said n-fold frequency, said clock signal generator circuit is synchronized during writing into the background store with the data bit frequency of the text data, and further comprises a switch which, during each $n^{th}$ period of the clock signal having the n-fold frequency, couples the input of the serial background store to the text data, and during the intermediate (n-1) periods couples the input of the serial background store to an output of a time delay circuit, an input of said time delay circuit being connected to the output of the serial background store.

9. An apparatus as claimed in claim 8, wherein the time delay circuit produces a time delay which is equal to one clock period of the clock signal generator for the n-fold frequency.

10. An apparatus as claimed in claim 1, wherein the background store is provided at its input with a magazine-selection circuit for recognizing a magazine number at the beginning of each line of the text data, and a store input switch which is controlled by the magazine selection circuit, an output of which is coupled to an input of the background store and which provides the background store with digital input signals which are associated with a selected magazine.

11. An apparatus as claimed in claim 10, in which a first part of the background store is for storing said digital input signals of said selected magazine, the background store having a second part for storing digital input signals, a time compression-input of which is coupled to a time-compression output of the store input switch whereby said second part of the background store is provided with at least a portion of digital input signals associated with magazines other than the selected magazine.

12. An apparatus as claimed in claim 11, wherein the background store is formed by a plurality of store modules, of which at least a first module is intended for magazine selection and at least a further module is coupled by the magazine selection circuit to the first module if the data of the selected magazine exceed the capacity of the first module, and in other cases is coupled to the second part of the background store.

13. An apparatus as claimed in claim 12, wherein the magazine selection circuit comprises at least a counting circuit for counting the number of pages of one magazine, the counting circuit generating a sum signal if the number of counted pages of a selected magazine are at least substantially equal to the page capacity of the first module, the sum signal being applied to a coupling circuit for coupling at least one other module to the first module.

14. An apparatus as claimed in claim 1, wherein the background store is continuously written-in during the occurrence of the text data.

15. An apparatus as claimed in claim 1, wherein the data input signals are written into the background store during a given time interval starting at the occurrence of a requested page of the text data.

16. An arrangement as claimed in claim 4, characterized in that data input signals are written into the background store during a given time interval starting at the occurrence of a requested page of the text data.

17. An arrangement as claimed in claim 10, characterized in that data input signals are written into the background store during a given time interval starting at the occurrence of a requested page of the text data.

* * * * *